(12) United States Patent
Zhang et al.

(10) Patent No.: US 10,381,938 B2
(45) Date of Patent: Aug. 13, 2019

(54) RESONANT DC-DC CONVERTER

(71) Applicant: Huawei Technologies Co., Ltd., Shenzhen (CN)

(72) Inventors: Yanzhong Zhang, Shanghai (CN); Fernando Ruiz Gomez, Kista (SE); Georgios Tsengenes, Kista (SE); Grover Victor Torrico-Bascopé, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/132,048

(22) Filed: Sep. 14, 2018

(65) Prior Publication Data

US 2019/0013741 A1    Jan. 10, 2019

Related U.S. Application Data

(63) Continuation of application No. PCT/EP2016/060876, filed on May 13, 2016.

(51) Int. Cl.
*H02M 3/335* (2006.01)
*H02M 3/28* (2006.01)
(Continued)

(52) U.S. Cl.
CPC ....... *H02M 3/33576* (2013.01); *H02M 1/083* (2013.01); *H02M 3/285* (2013.01);
(Continued)

(58) Field of Classification Search
CPC ............. H02M 3/33576; H02M 1/083; H02M 2001/0058; H02M 3/337; H02M 3/285;
(Continued)

(56) References Cited

U.S. PATENT DOCUMENTS

2006/0181252 A1   8/2006   Yoshida et al.
2007/0007929 A1   1/2007   Lee et al.
(Continued)

FOREIGN PATENT DOCUMENTS

CN   101841244 A   9/2010
CN   102594107 A   7/2012
(Continued)

OTHER PUBLICATIONS

Liu et al., "Modified Three-Phase Three-Level DC/DC Converter With Zero-Voltage-Switching Characteristic-Adopting Asymmetrical Duty Cycle Control", IEEE Transactions on Power Electronics, vol. 29, No. 12, pp. 6307-6318, XP011556071, Institute of Electrical and Electronics Engineers, New York, New York (Dec. 2014).
(Continued)

*Primary Examiner* — Kyle J Moody
(74) *Attorney, Agent, or Firm* — Leydig, Voit & Mayer, Ltd.

(57) ABSTRACT

A resonant circuit includes first, second, and third input nodes configured to receive a three phase input power and is formed as a delta circuit including a first leg connected between a first corner node and a second corner node, a second leg connected between the second corner node and a third corner node, and a third leg connected between the third corner node and the first corner node. A first outer resonant device is connected between the first input node and the first corner node, a second outer resonant device connected between the second input node and the second corner node, and a third outer resonant device connected between the third input node and the third corner node. Each leg of the delta circuit includes an inner resonant device connected in series with a corresponding transformer.

14 Claims, 12 Drawing Sheets

(51) Int. Cl.
  *H02M 3/337*  (2006.01)
  *H02M 1/08*  (2006.01)
  *H02M 1/00*  (2006.01)
  *H02M 7/48*  (2007.01)

(52) U.S. Cl.
  CPC .... *H02M 3/337* (2013.01); *H02M 2001/0058* (2013.01); *H02M 2001/0074* (2013.01); *H02M 2007/4815* (2013.01); *Y02B 70/1433* (2013.01); *Y02B 70/1441* (2013.01); *Y02B 70/1491* (2013.01)

(58) Field of Classification Search
  CPC .. H02M 2001/0074; H02M 2007/4815; Y02B 70/1433; Y02B 70/1491; Y02B 70/1441
  See application file for complete search history.

(56) References Cited

U.S. PATENT DOCUMENTS

| | | | |
|---|---|---|---|
| 2010/0328968 A1 | 12/2010 | Adragna et al. | |
| 2011/0075445 A1 | 3/2011 | Drummond et al. | |
| 2012/0188804 A1* | 7/2012 | Wallmeier | H02M 7/06 363/64 |
| 2012/0320638 A1* | 12/2012 | Boysen | H02M 3/3376 363/21.02 |
| 2013/0201725 A1 | 8/2013 | Boysen et al. | |
| 2016/0254756 A1* | 9/2016 | Yang | H01F 30/12 363/21.02 |
| 2018/0269795 A1* | 9/2018 | Zhou | H02M 3/33507 |

FOREIGN PATENT DOCUMENTS

| | | |
|---|---|---|
| CN | 103004074 A | 3/2013 |
| CN | 103560674 A | 2/2014 |
| CN | 103595367 A | 2/2014 |
| EP | 3054593 A1 | 8/2016 |
| WO | 2015066997 A1 | 5/2015 |

OTHER PUBLICATIONS

Lazar et al, "Steady-state analysis of the LLC series resonant converter," APEC 2001. Sixteenth Annual IEEE Applied Power Electronics Conference and Exposition, Institute of Electrical and Electronics Engineers, New York, New York (2001).

Dick et al, "Comparison of Three-Phase DC-DC Converters vs. Single-Phase DC-DC Converters," 2007 7th International Conference on Power Electronics and Drive Systems, Institute of Electrical and Electronics Engineers, New York, New York (2007).

Orietti et al, "Analysis of multi-phase LLC resonant converters," 2009 IEEE Brazilian Power Electronics Conference, Institute of Electrical and Electronics Engineers, New York, New York (2009).

Jacobs et al, "A transformer comparison for three-phase single active bridges," 2005 European Conference on Power Electronics and Applications, (2005).

* cited by examiner

RESONANT DC-DC CONVERTER

CROSS-REFERENCE TO RELATED APPLICATIONS

This application is a continuation of International Application No. PCT/EP2016/060876, filed on May 13, 2016, the disclosure of which is hereby incorporated by reference in its entirety.

TECHNICAL FIELD

The aspects of the present disclosure relate generally to power conversion apparatuses and more particularly to resonant DC to DC power converters.

BACKGROUND

Resonant DC to DC converters are considered by many to be attractive power conversion solutions for the many benefits they can provide. Following a resonant tank with transformers provides galvanic isolation which is important for level conversion as well as for safety. In certain applications, such as thin film solar panels, galvanic isolation is required for proper operation. Resonant converters also have inherent properties, such as soft switching of the semiconductor switches, which lead to high efficiency and low noise.

A commonly used type of resonant converter is known as the LLC resonant converter, named for the two inductors and one capacitor used to form its resonant tank. The LLC resonant converter has gained popularity due to its ability to achieve high efficiency. However, drawbacks of this type of converter include high AC currents in the output capacitors resulting in higher than desired power losses as well as the large volume or size taken up by the output filter components.

Combining or paralleling multiple LLC converters and interleaving their outputs with appropriate pulse width modulation (PWM) can reduce output ripple current and help reduce the volume required for the output filter capacitor. However due to voluntary and regulatory requirements, further improvements in efficiency and size are still desirable and may be required in certain applications. Thus, there is a need for improved resonant DC to DC converter topologies that can deliver better efficiency and low noise from smaller packages.

Accordingly, it would be desirable to provide a DC-DC converter topology that addresses at least some of the problems identified above.

SUMMARY

It is an object of the embodiments of the present invention to provide improved resonant DC to DC converter topologies that can deliver better efficiency and lower noise from smaller packages. This object is solved by the subject matter of the independent claims. Further advantageous modifications can be found in the dependent claims.

According to a first aspect of the embodiments of the present invention the above and further objects and advantages are obtained by a resonant circuit including a first input node, a second input node, and a third input node, where each of the first, second and third input nodes are configured to receive one phase of a three phase input power. The resonant circuit is formed as a delta circuit including a first leg connected between a first corner node and a second corner node, a second leg connected between the second corner node and a third corner node, and a third leg connected between the third corner node and the first corner node. The resonant circuit also includes a first outer resonant device connected between the first input node and the first corner node, a second outer resonant device connected between the second input node and the second corner node, and a third outer resonant device connected between the third input node and the third corner node. Each leg of the delta circuit includes an inner resonant device connected in series with a corresponding transformer. Locating the inner resonant devices inside the delta circuit and the outer resonant devices outside the delta circuit improves the performance of the DC to DC converter, such as by improving the zero voltage switching performance.

In a first possible implementation form of the resonant circuit according to the first aspect the first leg includes a first inner resonant device connected in series between the first corner node and a first transformer, the second leg includes a second inner resonant device connected in series between the second corner node and a second transformer, and the third leg includes a third inner resonant device connected in series between the third corner node and a third transformer. Locating the inner resonant devices inside the delta circuit and the outer resonant devices outside the delta circuit improves the performance of the DC to DC converter.

In a second possible implementation form of the resonant circuit according to the first possible implementation form of the first aspect the first outer resonant device, the second outer resonant device, and the third outer resonant device, are capacitors, and the first inner resonant device, the second inner resonant device, and the third inner resonant device are inductors. This implementation form improves the zero voltage switching efficiency of an inverter circuit used to provide the three phase power to the resonant circuit.

In a third possible implementation form of the resonant circuit according to the first or second possible implementation forms of the first aspect as such the first outer resonant device, the second outer resonant device, and the third outer resonant device are inductors, and the first inner resonant device, the second inner resonant device, and the third inner resonant device are capacitors. This implementation form improves the zero voltage switching efficiency of an inverter circuit used to provide the three phase power to the resonant circuit.

In a fourth implementation form of the resonant circuit according to the first aspect as such or to the first through third implementation forms of the first aspect the first inner resonant device, the second inner resonant device, and the third inner resonant device are incorporated into a single integrated inductive device. This implementation form improves the power density of the resonant circuit.

In a fifth possible implementation form of the resonant circuit according to the first aspect as such or to the first through fourth implementation forms of the first aspect the first outer resonant device, the second outer resonant device and the third outer resonant device are incorporated into a single integrated inductive device. Integrating the three inductive devices into a single integrated inductive device increases the power density of the resonant circuit.

In a sixth possible implementation form of the resonant circuit according to the first aspect as such or to the first through fifth possible implementation forms the first transformer includes a first primary winding connected in parallel with a first shunt inductor, the second transformer includes a second primary winding connected in parallel with a second shunt inductor and the third transformer includes a third primary winding connected in parallel with a third shunt inductor. This implementation form provides better control over the shunt inductor.

In a seventh possible implementation form of the resonant circuit according to the first aspect as such or to the sixth possible implementation form of the first aspect the first shunt inductor, the second shunt inductor, and the third shunt inductor, are incorporated into a single integrated inductive device. Incorporating the three shunt inductors into a single inductive device reduces cost.

In an eighth possible implementation form of the resonant circuit according to the first aspect as such or to the sixth or seventh possible implementation forms of the first aspect the first shunt inductor, the second shunt inductor, and the third shunt inductor are formed by a magnetizing inductance of the first primary winding, the second primary winding, and the third primary winding respectively. This implementation form reduces the number of discrete electronic devices used to construct the resonant circuit.

In a ninth possible implementation form of the resonant circuit according to the first aspect as such or to the sixth through eighth possible implementation forms of the first aspect the first transformer includes a first secondary winding magnetically coupled to the first primary winding, the second transformer includes a second secondary winding magnetically coupled to the second primary winding, and the third transformer includes a third secondary winding magnetically coupled to the third primary winding, and wherein the first secondary winding, the second secondary winding, and the third secondary winding are connected together in a delta configuration. This implementation form allows three phase power to be output through only three conductors.

In a tenth possible implementation form of the resonant circuit according to the first aspect as such or to the ninth possible implementation form of the first aspect the first secondary winding, the second secondary winding, and the third secondary winding are connected together in a star configuration. This implementation form allows three phase power to be output through only three conductors.

In an eleventh possible implementation form of the resonant circuit according to the first aspect as such or to the ninth or tenth possible implementation forms of the first aspect a first resonant circuit output node is connected to the first secondary winding, a second resonant circuit output node is connected to the second secondary winding, a third resonant circuit output node is connected to the third secondary winding, and a rectifier circuit is configured to receive a three phase AC power from the first resonant circuit output node, the second resonant circuit output node and the third resonant circuit output node to produce a DC power. This implementation form produces a DC power from the resonant circuit three phase AC output power.

In a twelfth possible implementation form of the resonant circuit according to the first aspect as such or to the first through eleventh possible implementation form of the first aspect an inverter circuit is configured to receive a DC input voltage, wherein the inverter circuit includes: a first half bridge circuit, a second half bridge circuit, and a third half bridge circuit, each connected in parallel across the DC input voltage and configured to provide a square wave voltage to a respective one of the first input node, the second input node and the third input node.

In a thirteenth possible implementation form of the resonant circuit according to the first aspect as such or to the twelfth possible implementation form of the first aspect the first half bridge circuit, the second half bridge circuit, and the third half bridge circuit are connected in series across the DC input voltage. This implementation form allows the resonant circuit to be driven from a DC power source.

In a fourteenth possible implementation form of the first aspect as such or to the first through thirteenth possible implementation forms of the first aspect the first transformer, the second transformer, and the third transformer are incorporated into a single integrated transformer device. Integrating all three transformer devices into a single integrated transformer device increases the power density and reduces manufacturing cost of the resonant circuit.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed invention, for which reference should be made to the appended claims. Additional aspects and advantages of disclosure will be set forth in the description that follows, and in part will be obvious from the description, or may be learned by practice of disclosure. Moreover, the aspects and advantages of disclosure may be realized and obtained by means of the instrumentalities and combinations particularly pointed out in the appended claims.

BRIEF DESCRIPTION OF THE DRAWINGS

In the following detailed portion of the present disclosure, disclosure will be explained in more detail with reference to the example embodiments shown in the drawings, in which.

DETAILED DESCRIPTION OF THE DISCLOSED EMBODIMENTS

Figure 1:
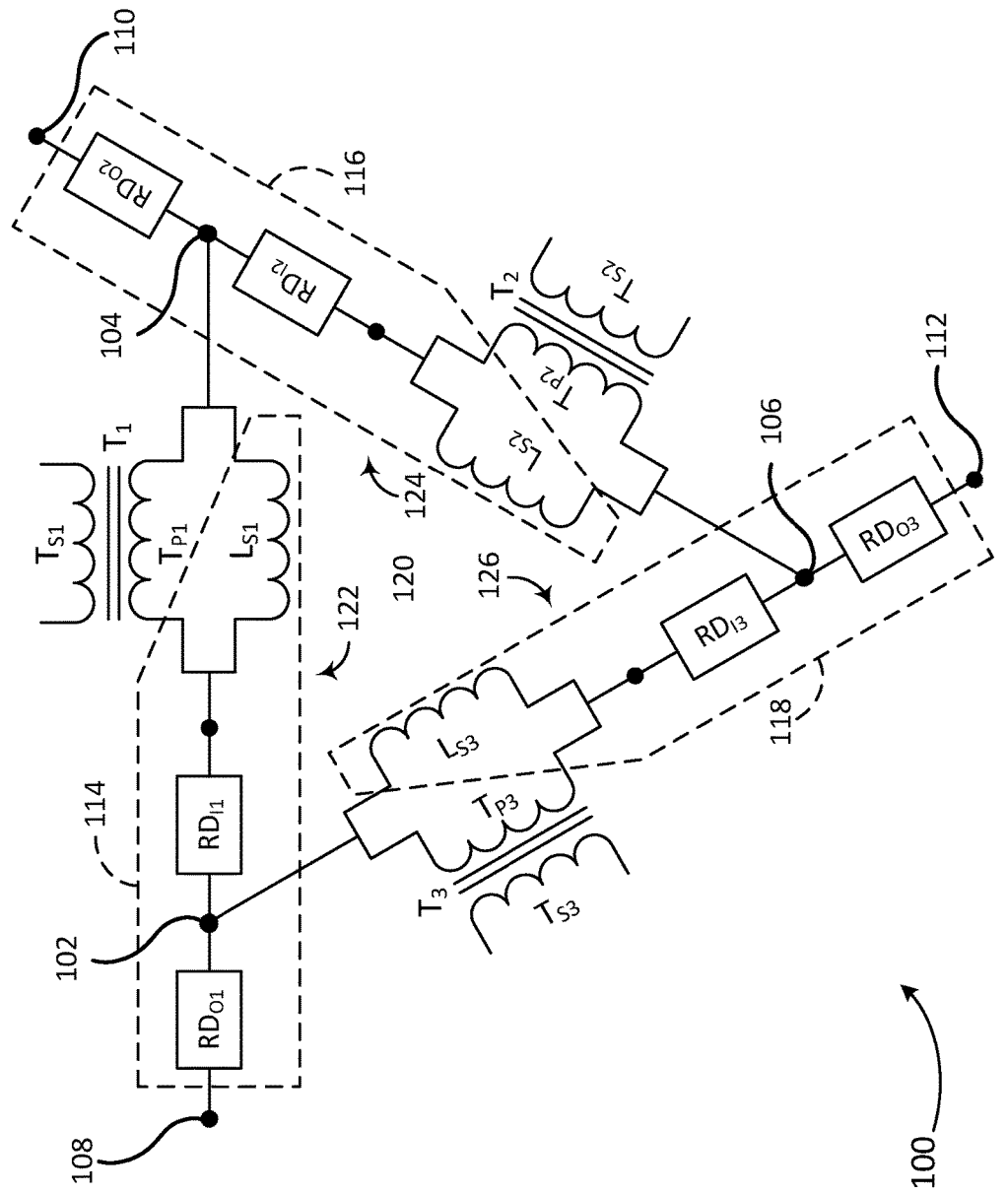
FIG. 1 illustrates an exemplary three phase resonant circuit topology incorporating aspects of the disclosed embodiments.
Figure 1A:
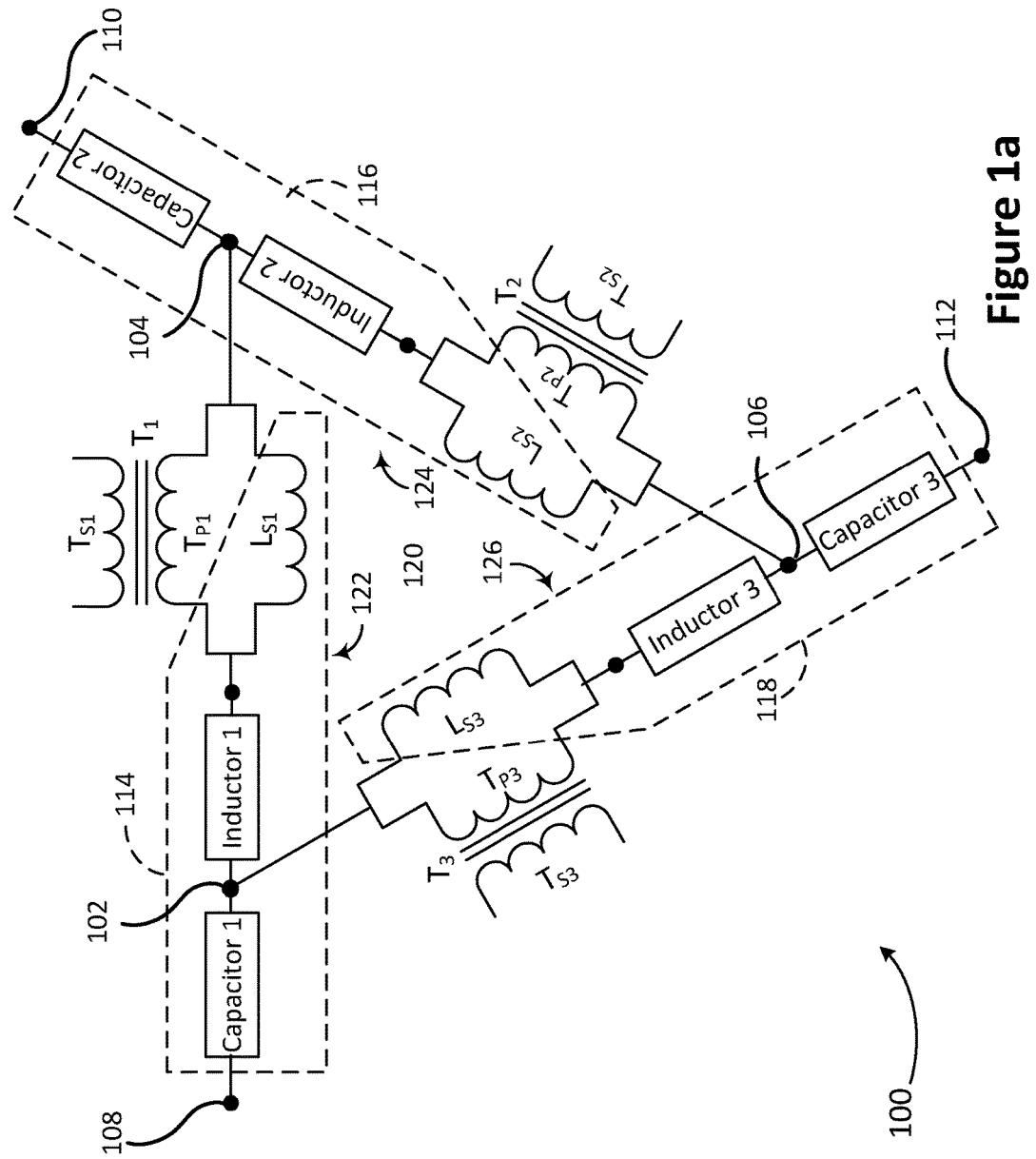
FIG. 1a illustrates another exemplary three phase resonant circuit topology incorporating aspects of the disclosed embodiments.
Figure 1B:
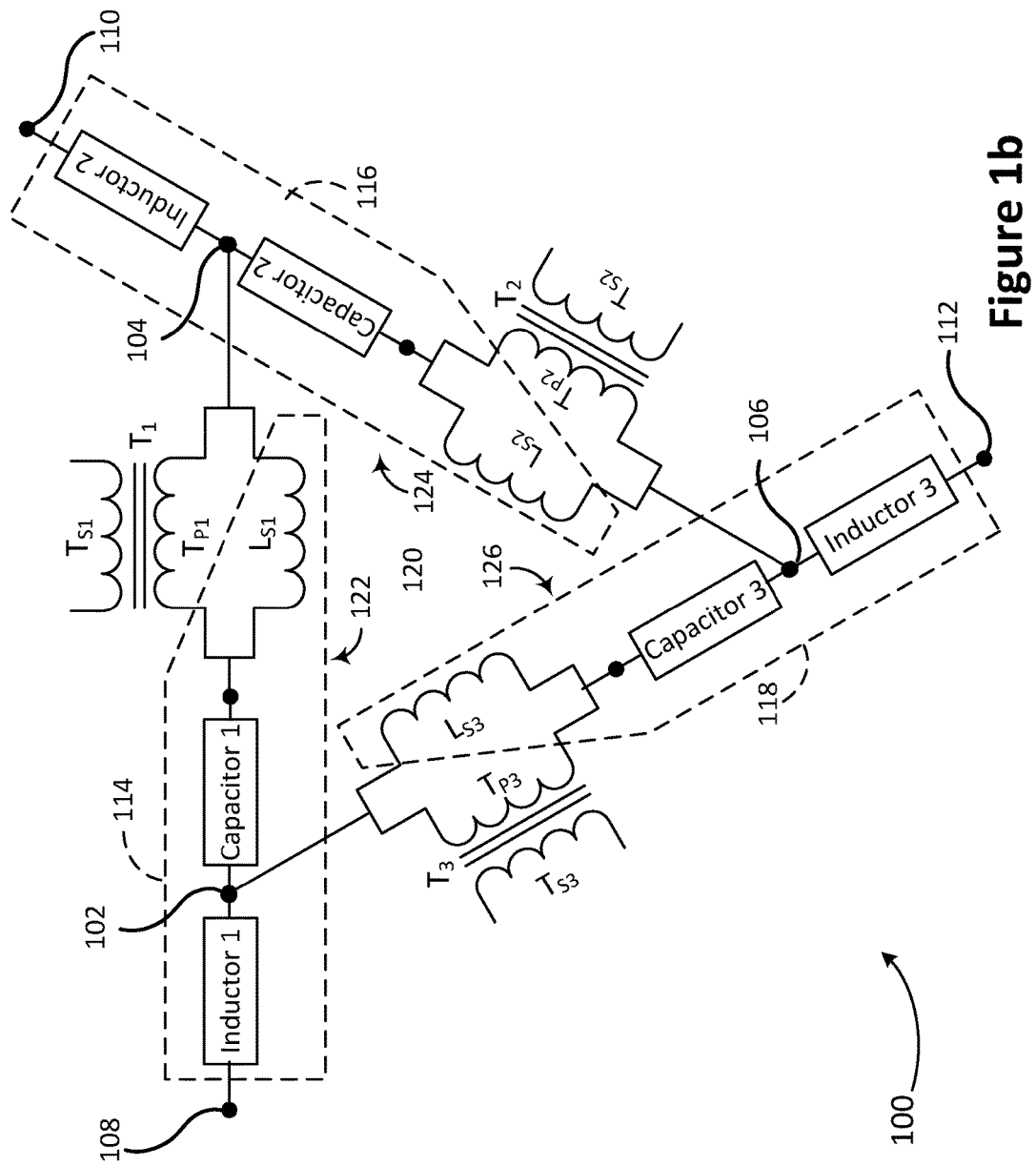
FIG. 1b illustrates still another exemplary three phase resonant circuit topology incorporating aspects of the disclosed embodiments.

Referring to FIG. 1 there can be seen an exemplary embodiment of a three phase resonant circuit 100 appropriate for use in a three phase resonant DC to DC converter. Three phase power as used herein refers to a type of electric power where three conductors, or phases, are used to carry an alternating current (AC), where each phase has the same frequency and voltage relative to a common reference and each phase is offset by 120 degrees from the other two phases. Generally, all phases in a three phase electric power have symmetric waveforms, such as a sinusoid or square wave, such that at any given time two of the phases will offset the third phase. The resonant circuit 100 is configured to receive a three phase electric power on three resonant circuit input nodes 108, 110, 112, where each resonant circuit input node 108, 100, 112 is configured to receive a different one of the input phases.

Each resonant circuit input node 108, 110, 112 is coupled to a different corner node 102, 104, 106 of a three phase delta circuit 120 through an outer resonant device $RD_{O1}$, $RD_{O2}$, $RD_{O3}$ as illustrated in FIG. 1. The three outer resonant devices $RD_{O1}$, $Rd_{O2}$, $RD_{O3}$ are energy storage type electronic elements located outside the delta circuit 120. The term "resonant device" as used herein generally refers to an electronic component configured to store electric energy, such as an inductor or a capacitor. For example in one exemplary embodiment all three outer resonant devices $RD_{O1}$, $RD_{O2}$, $RD_{O3}$ are capacitors. Alternatively, all three outer resonant devices $RD_{O1}$, $RD_{O2}$, $RD_{O3}$ may be inductors.

A delta circuit as used herein is a conventional three phase circuit having three corner nodes and three circuit legs where each leg connects two of the corner nodes. In the example of FIG. 1 the circuit leg 122 connects corner node 102 to the corner node 104, circuit leg 124 connects the corner node 104 to corner node 106 and the circuit leg 126 connects the corner node 106 to the corner node 102. For the purposes of the description herein, the corner nodes 102, 104 and 106 will be referred to as the first corner node 102, the second corner node 104 and the third corner node 106, merely for ease of understanding. In the delta circuit 120, the three circuit legs 122, 124, 126 are substantially the same, having the same configuration, type, and value of circuit elements.

As shown in FIG. 1, delta circuit leg 122 has an inner resonant device $RD_{I1}$ coupled in series with a transformer $T_1$. In the example of FIG. 1, transformer $T_1$ includes primary winding $T_{P1}$. A shunt inductor $L_{S1}$ is coupled in parallel with the transformer primary winding $T_{P1}$. Similarly, delta circuit legs 124 and 126 have an inner resonant device $RD_{I2}$, and $RD_{I3}$, respectively, coupled in series with a corresponding transformer $T_2$ and $T_3$, respectively. In the example of FIG. 1, transformer $T_2$ includes primary winding $T_{P2}$, and transformer $T_3$ includes primary winding $T_{P1}$. Transformer $T_2$ also includes a shunt inductor $L_{S2}$, while transformer $T_3$ includes shunt inductor $L_{S3}$ In the example of FIG. 1, shunt inductors $L_{S2}$ and $L_{S3}$ are respectively coupled in parallel with the corresponding transformer primary winding $T_{P2}$, and $T_{P3}$.

Similar to the outer resonant devices $RD_{O1}$, $RD_{O2}$, $RD_{O3}$ described above, the inner resonant devices $RD_{I1}$, $RD_{I2}$, $RD_{I3}$, all include similar types of energy storage element. In embodiments where the outer resonant devices $RD_{O1}$, $RD_{O2}$, $RD_{O3}$ are capacitors, the inner resonant devices $RD_{I1}$, $RD_{I2}$, $RD_{I3}$ may all be inductors. In embodiments where the outer resonant devices $RD_{O1}$, $RD_{O2}$, $RD_{O3}$ are inductors, the inner resonant devices $RD_{I1}$, $RD_{I2}$, $RD_{I3}$ may be capacitors.

A secondary winding $T_{S1}$, $T_{S2}$, $T_{S3}$ is magnetically coupled to each primary winding $T_{P1}$, $T_{P2}$, $T_{P3}$ respectively and provides galvanic isolation between the input power, which is applied to the resonant circuit input nodes 108, 110, 112. An output power of the resonant circuit 100 is taken from the transformer secondary windings $T_{S1}$, $T_{S2}$, $T_{S3}$. In certain embodiments it is desirable to configure a turn ratio between the primary windings $T_{P1}$, $T_{P2}$, $T_{P3}$ and the transformer secondary windings $T_{S1}$, $T_{S2}$, $T_{S3}$, thereby allowing easy configuration of a change in the output power level.

Each phase or leg 122, 124, 126 includes a resonant tank 114, 116, 118, effectively coupled in series with the load, as it is reflected to the transformer primary winding $T_{P1}$, $T_{P2}$, $T_{P1}$. In operation the resonant tank 114, 115, 116 acts as a voltage divider allowing the power applied to the load to be regulated by changing impedance of the resonant tank 114, 116, 118. Thus, the output power may be regulated by changing the frequency of the power received on the resonant circuit input nodes 108, 110, 112.

In the exemplary resonant circuit 100, each resonant tank 114, 116, 118 is split such that the shunt inductance $L_{S1}$, $L_{S2}$, $L_{S3}$ and the inner resonant device $RD_{I1}$, $RD_{I2}$, $RD_{I3}$ are located inside the delta circuit 120. The outer, resonant device $RD_{O1}$, $RD_{O2}$, $RD_{O3}$ in each resonant tank 114, 116, 118 is located outside the delta circuit 120. In embodiments where the inner resonant device $RD_{I1}$, $RD_{I2}$, $RD_{I3}$ is an inductor, the inner resonant devices $RD_{I1}$, $RD_{I2}$, $RD_{I3}$ may be integrated with the main transformers T1, T2, and T3, thereby increasing the power density of the converter 100. Alternatively, in embodiments where the inner resonant devices $RD_{I1}$, $RD_{I2}$, $RD_{I3}$ are inductors, the three inductors may be integrated into a single inductive device.

The illustrated resonant circuit 100 topology also allows all three main transformers T1, T2, T3 to be integrated into a single transformer. When the inner resonant devices $RD_{I1}$, $RD_{I2}$, $RD_{I3}$ are inductors, these inductors may be integrated together into a single inductive device. The inner resonant inductors $RD_{I1}$, $RD_{I2}$, $RD_{I3}$ may also be integrated along with the three main transformers T1, T2, T3 to form a single transformer/inductive device.

Figure 2:
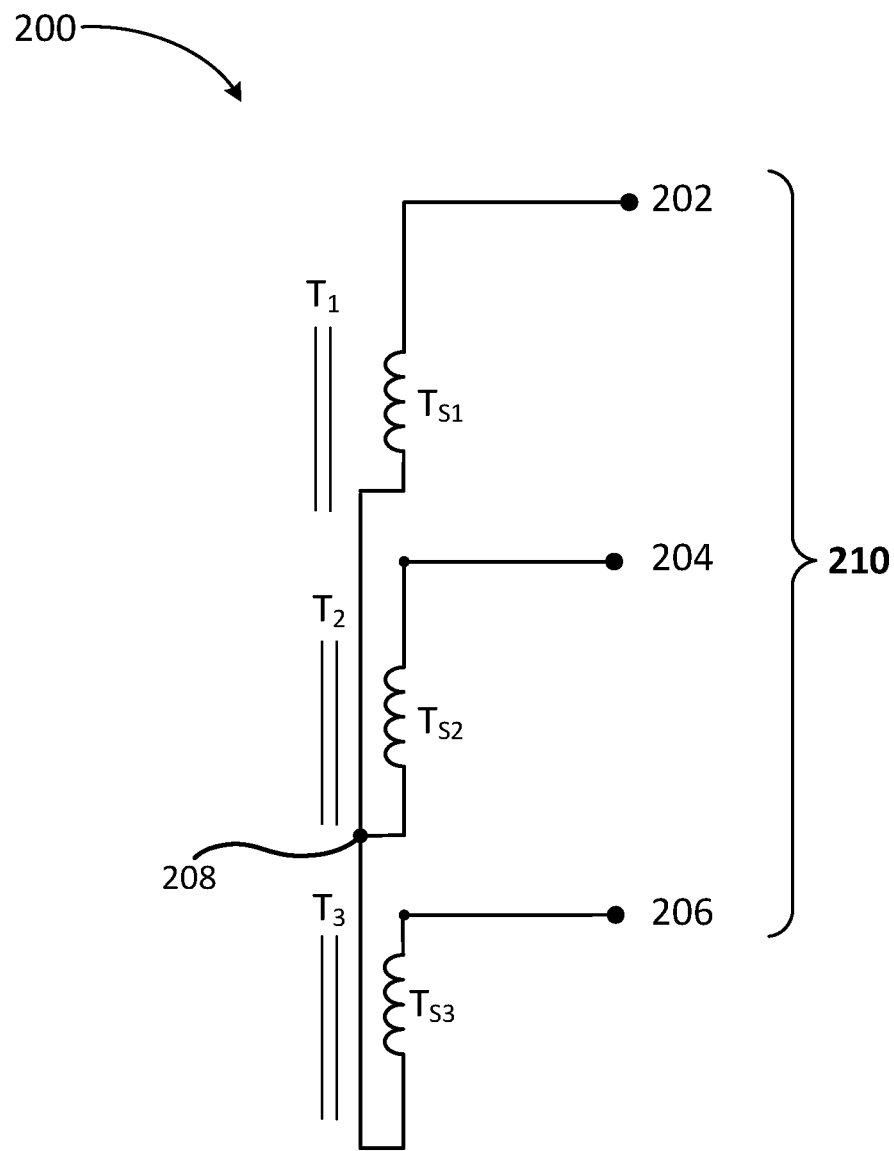
FIG. 2 illustrates a schematic diagram of an exemplary star configuration for the secondary windings of a three phase resonant circuit incorporating aspects of the disclosed embodiments.

FIG. 2 illustrates a schematic diagram of an exemplary three phase star configuration 200 appropriate for coupling the secondary windings $T_{S1}$, $T_{S2}$, $T_{S3}$ of a three phase resonant circuit, such as the resonant circuit 100 described above. The three phase star configuration 200 is configured to produce a three phase AC output power 210 across three resonant circuit output nodes 202, 204, 206 which are coupled to the secondary windings $T_{S1}$, $T_{S2}$, $T_{S3}$ of a resonant circuit 100. A circuit node 208 is coupled to each of the secondary windings $T_{S1}$, $T_{S2}$, $T_{S3}$ to form a virtual common node for the three phases of a three phase AC power 210. The configuration 200 of the secondary or output windings $T_{S1}$, $T_{S2}$, $T_{S3}$ is referred to as a star configuration, or a wye "Y" configuration. The star configuration 200 produces a three phase AC output power 210 at the resonant circuit output nodes 202, 204, 206 with the common node 208 acting as a virtual common.

Figure 3:
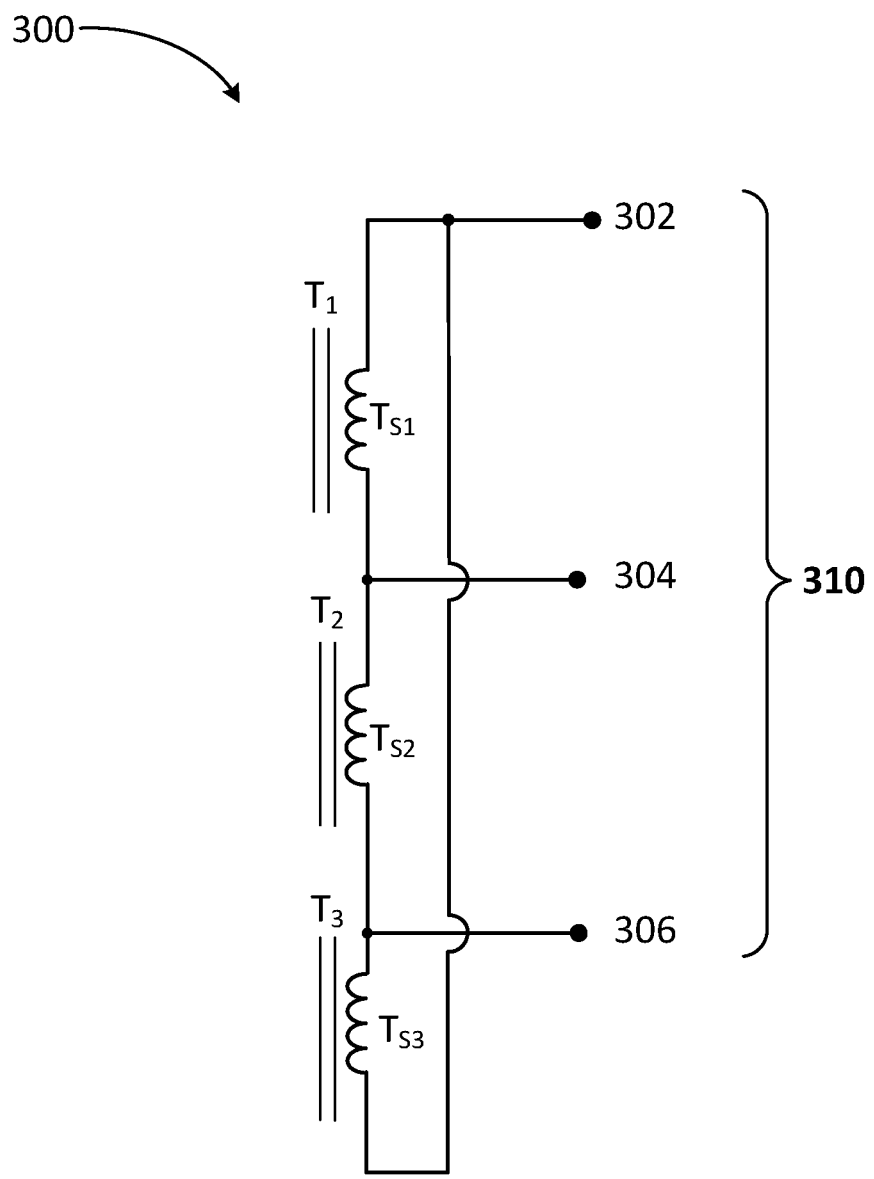
FIG. 3 illustrates a schematic diagram of an exemplary delta configuration for the secondary windings of a three phase resonant circuit incorporating aspects of the disclosed embodiments.

Referring to FIG. 3, in one embodiment the secondary windings $T_{S1}$, $T_{S2}$, $T_{S3}$ of the resonant circuit 100 may be configured in a delta configuration 300. In a delta configuration 300 the three secondary windings $T_{S1}$, $T_{S2}$, $T_{S3}$ are coupled in series with each other, with the first secondary winding $T_{S1}$ being coupled to the second secondary winding $T_{S2}$, the second secondary winding $T_{S2}$ being coupled to the third secondary winding $T_{S3}$, and the third secondary winding $T_{S3}$ being coupled back to the first secondary winding $T_{S1}$. The delta configuration 300 forms a triangular topology with a corner node between each pair of secondary windings. In the delta configuration 300 the three outputs 302, 304, 306 or corner nodes are formed between each pair of secondary windings $T_{S1}$, $T_{S2}$, $T_{S3}$. The delta configuration 300 produces a three phase AC power 310 at resonant circuit output nodes 302, 304, 306.

Figure 4:
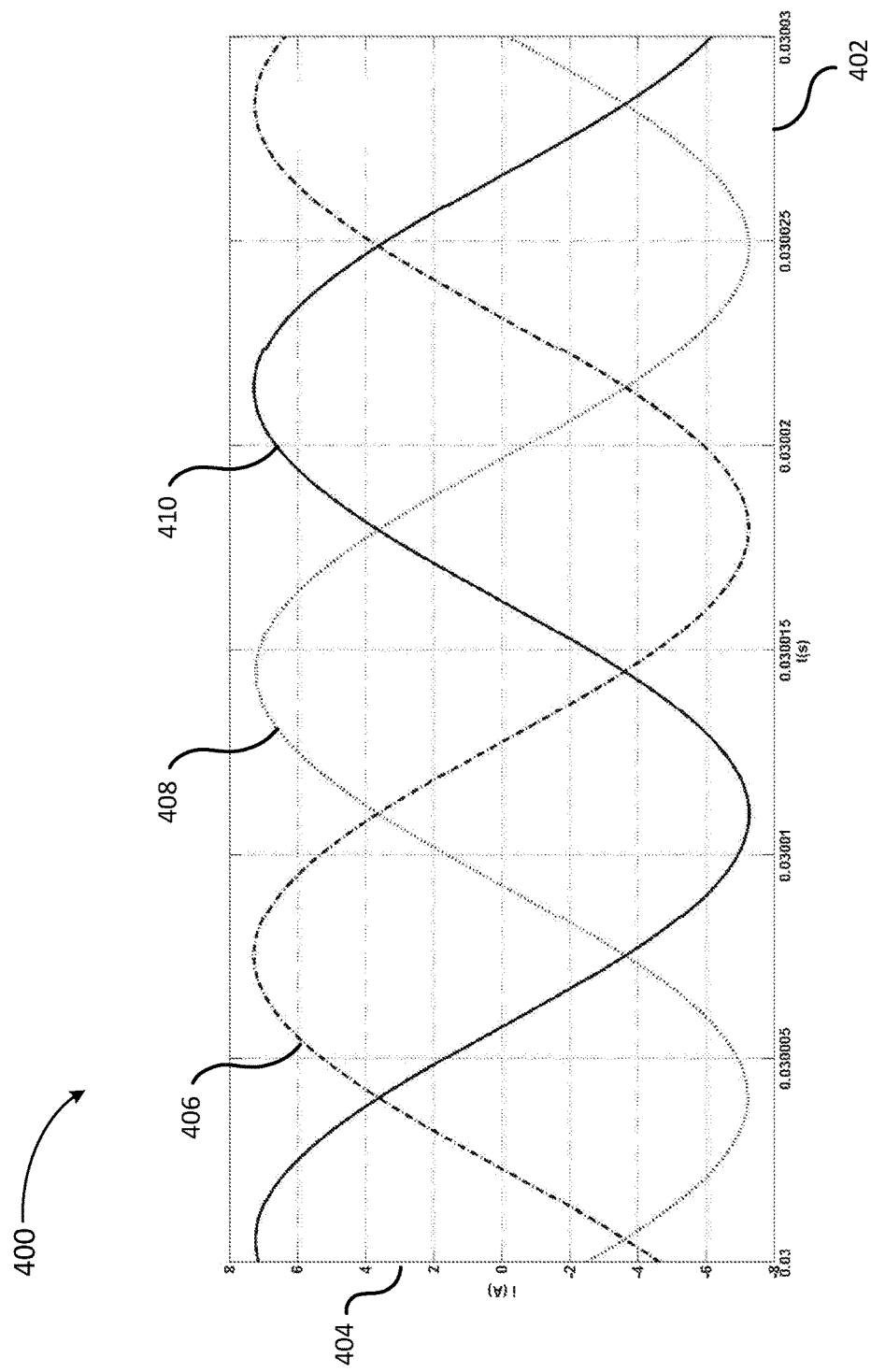
FIG. 4 illustrates a graph showing current through resonant inductors of a resonant circuit incorporating aspects of the disclosed embodiments.

FIG. 4 illustrates a graph 400 showing the currents 406, 408, 410 through the three resonant inductors of a resonant circuit, such as the exemplary resonant circuit 100 described above. The secondary transformer windings $T_{S1}$, $T_{S2}$, $T_{S3}$ of the resonant circuit 100 may be coupled in either a star 200 or delta 300 configuration. The illustrated graph 400 measures time in seconds increasing to the right along a horizontal axis 402, and measures current in amperes (A) increasing upward along a vertical axis 404. The three inductor currents 406, 408, 410 are offset in phase by 120 degrees from each other thereby forming a three phase AC power.

Figure 5:
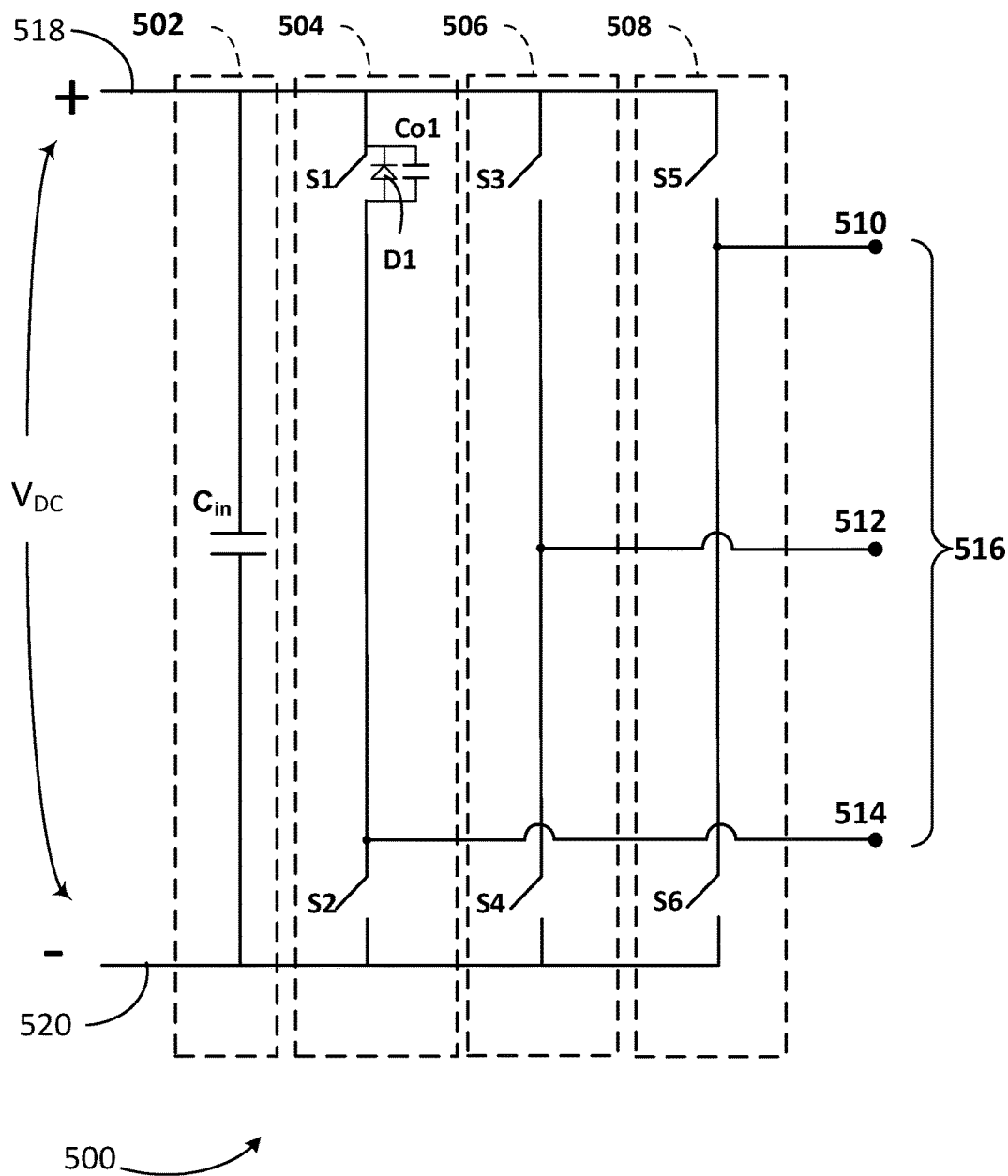
FIG. 5 illustrates a three phase inverter circuit for a resonant circuit incorporating aspects of the disclosed embodiments.

As described above with reference to FIG. 1, the resonant circuit 100 is configured to receive a variable frequency three phase AC input power at the resonant circuit input nodes 108, 110, 112. Variable frequency three phase AC power suitable for supplying the resonant circuit 100 may be generated from a DC power using an inverter circuit. FIG. 5 illustrates a three phase inverter circuit 500 configured to receive a DC power $V_{DC}$ and create a three phase AC power 516 appropriate for driving the resonant circuit 100. The inverter circuit 500 is configured to receive the DC input power $V_{DC}$ across positive (+) and negative (−) input rails 518, 520. An input capacitor $C_{IN}$ is coupled across the input rails 518, 520 and provides filtering of the DC input power $V_{DC}$. Three half bridge circuits 504, 506, 508 are coupled in parallel across the DC input power $V_{DC}$ and may be operated to produce a three phase power 516 at three output nodes 510, 512, 514. Each half bridge circuit 504, 506, 508 includes a pair of switches, S1, S2, S3, S4, and S5, S6 respectively. These pairs of switches allow the output node 510, 512, 514 to be alternately coupled to the positive input rail 518 or to the negative input rail 520 to create an AC power signal at the corresponding output node 510, 512, 514.

Figure 6:
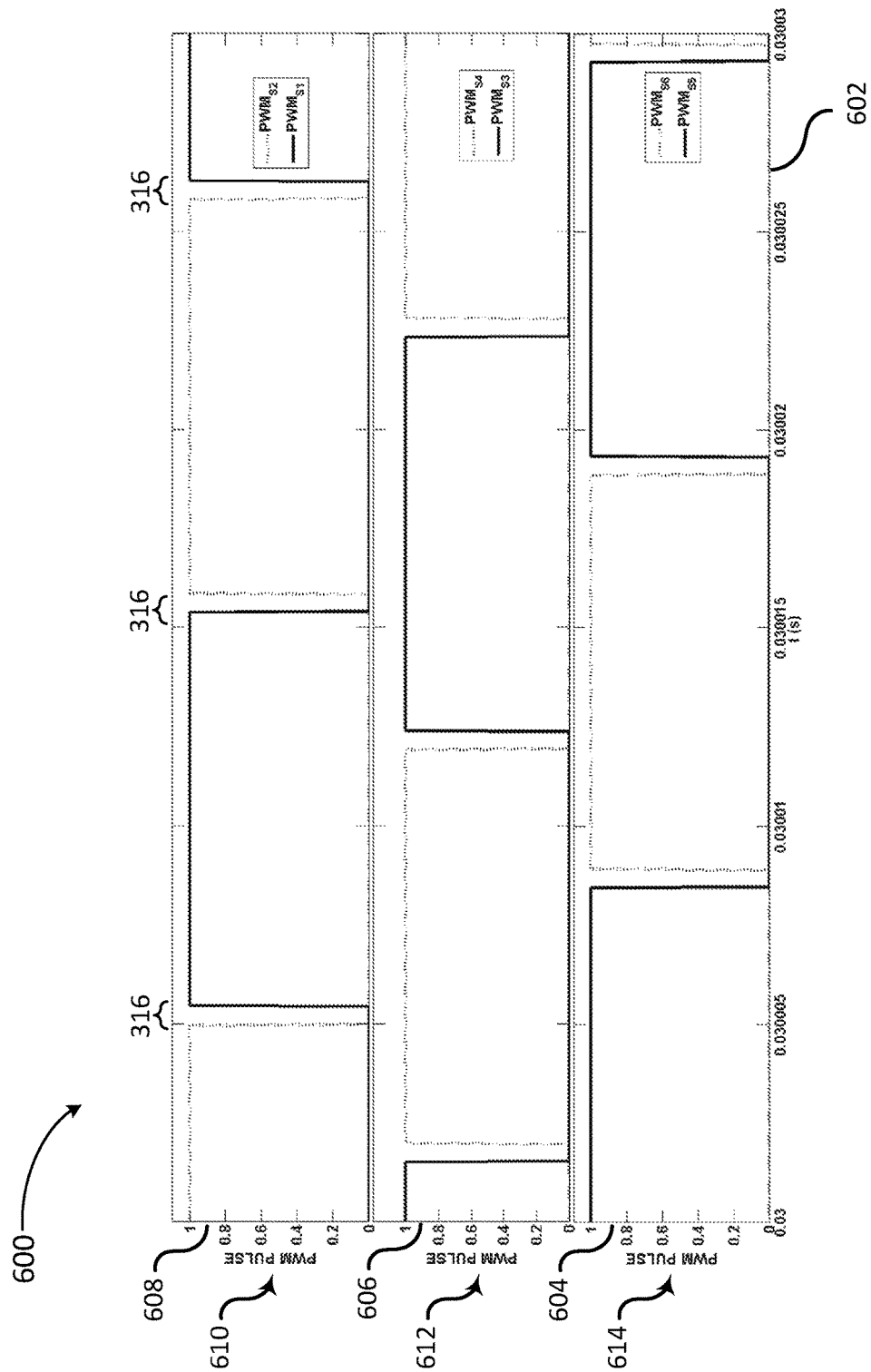
FIG. 6 illustrates a graph showing exemplary switch control signals for a resonant circuit incorporating aspects of the disclosed embodiments.

Certain switching devices S1, such as metal-oxide-semiconductor field-effect-transistors, (MOSFET) include a body diode D1 in parallel with the switching device S1. This diode D1 is necessary when zero voltage switching (ZVS) is implemented in the circuit, because the diode D1 is conducting prior to the switch S1 during turn-on. When a different type of switching device S1 is used, such as an insulated gate bipolar transistor (IGBT), the switching device S1 may not include an inherent diode D1 and a separate diode D1 needs to be added in parallel with the switching device S1 as illustrated. MOSFET switching devices appropriate for use as the switches S1, S2, S3, S4, S5, S6 in the inverter 500 include a parasitic capacitance that may be represented as a capacitor Co1 in parallel with the switch S1. During operation this parasitic capacitance is discharged allowing the voltage across the switching device S1 to go to substantially zero volts before the switch S1 is turned on. This is referred to as zero voltage switching. There will be a capacitance, either parasitic capacitance inherent in the switching devices or as added capacitors, in parallel with the switch in all embodiments where ZVS is implemented. When MOSFET switching devices are used the capacitance Co1 is inherent in the device and when IGBT switching devices are used a separate parallel capacitance Co1 is added. As an aid to readability only the capacitance Co1 and the diode D1 associated with the switch S1 are illustrated in the schematic diagram of FIG. 5, however those skilled in the art will recognize that the remaining switches S2, S3, S4, S5, and S6 also include similar parallel diodes and capacitances. The parallel diode D1 and capacitance Co1 are utilized during the ZVS function of the converter and are included in all converter topologies when ZVS is implemented. Any suitable type of switching device may be used for the switches S1, S2, S3, S4, S5, S6 such as IGBT and MOSFET devices constructed from a variety of materials including silicon (Si), silicon-carbide (SiC), gallium nitride (GaN) as well as other semiconductor materials. By appropriately operating the switches S1, S2, S3, S4, S5, S6, the three half bridge circuits 504, 506, 508 can produce a three phase AC power at the inverter circuit 500 output nodes 510, 512, 514. Each switch S1, S2, S3, S4, S5 and S6 is configured to be operated, i.e. turned on or off, by a switch control signal (not shown). FIG. 6 illustrates a graph showing exemplary switch control signals 600, also referred to herein as pulse width modulated (PWM) signals, that may be used to operate the switches S1, S2, S3, S4, S5 and S6 to produce a three phase power suitable for driving the resonant circuit 100 described above. The exemplary graph of switch control signals 600 measures time increasing to the right along a horizontal axis 602, and control signal magnitude (PWM PULSE) increasing upwards along each vertical axes 604, 606, 608, where a switch control signal magnitude of one (1) represents a switch that is on or conducting current, and a control signal magnitude of zero (0) represents a switch that is off or is not conducting current.

The top graph 610 represents the control signals $PWM_{S1}$, $PWM_{S2}$ for the upper switch S1 and lower switch S2, respectively, of the first half bridge 504 shown in FIG. 5. The middle graph 612 represents the control signals $PWM_{S3}$, $PWM_{S4}$ for the upper switch S3 and lower switch S4, respectively. of the second half bridge 506. The bottom graph 614 represents the control signals $PWM_{S5}$, $PWM_{S6}$ for the upper switch S5 and lower switch S6 of the third half bridge 606, respectively.

Applying the switch control signals 600 to the switches S1, S2, S3, S4, S5 and S6 of the inverter 500 will generate a three phase AC output power 516 at the output nodes 510, 512, 514 of the inverter 500. Note that during each switching period 616, one switch in a half bridge circuit is turned off before the other switch is turned on. Because the switches S1, S2, S3, S4, S5, S6 take a finite amount of time to turn OFF or ON, this switching period 616, where both switch control signals for a half bridge are at zero magnitude or off, is used to allow the voltage across the capacitor Co1 enough time to discharge prior to turning on the switch in order to achieve ZVS.

Referring again to FIG. 1, splitting the resonant tank 114, 116, 118 such that the shunt inductance $L_{S1}$, $L_{S2}$, $L_{S3}$ and the inner resonant device $RD_{I1}$, $RD_{I2}$, $RD_{I3}$ are located inside the delta circuit 120 and the third resonant device $RD_{O1}$, $RD_{O2}$, $RD_{O3}$ of each resonant tank 114, 116, 118 is located outside the delta circuit 120, significantly improves the zero voltage switching (ZVS) performance of the inverter circuit, such as the three phase inverter circuit 500, being used to drive the resonant circuit 100. The improved ZVS performance results from the way the parasitic capacitance of the inner resonant device $RD_{I1}$, $RD_{I2}$, $RD_{I3}$, in embodiments where the inner resonant device $RD_{I1}$, $RD_{I2}$, $RD_{I3}$ is an inductor, is treated. In these embodiments, the parasitic capacitance of the inner resonant device $RD_{I1}$, $RD_{I2}$, $RD_{I3}$ is in series with the capacitance Co1 over the switches S1, S2, S3, S4, S5 and S6. By placing the inner resonant device $RD_{I1}$, $RD_{I2}$, $RD_{I3}$ inside the delta circuit 120 the parasitic capacitance is significantly increased thereby reducing the energy needed for ZVS. This allows the resonant converter circuit configuration 100 to reduce the circulating ZVS current and, as a result, the total losses of a converter built around the resonant circuit 100 are also reduced.

Figure 7:
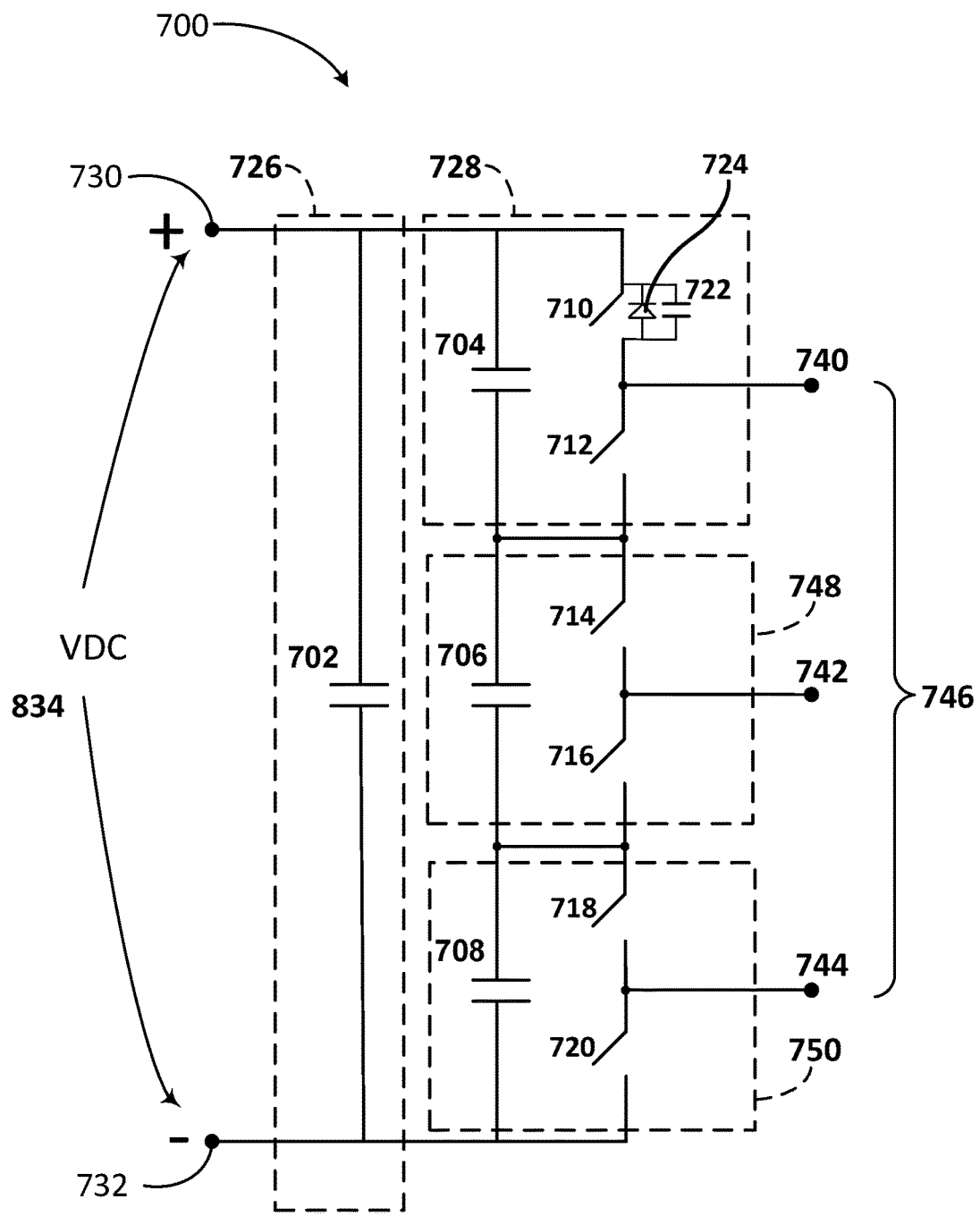
FIG. 7 illustrates a schematic diagram of an exemplary inverter circuit for a resonant circuit incorporating aspect of the disclosed embodiments.

FIG. 7 illustrates a schematic diagram of an inverter circuit 700 configured to convert a DC input voltage VDC to a three phase AC power 746 suitable for driving the resonant circuit 100. The inverter circuit 700 is configured to receive a DC input power VDC across positive (+) and negative (−) input rails 730, 732. An input capacitor 702 is coupled across the input rails 730, 732 and provides filtering of the DC input power VDC. In contrast with the inverter circuit 500 described above, the three half bridge converters 728, 748, 750 of the inverter circuit 700 are coupled in series across the input power VDC. The three half bridge circuits 728, 748, 750 may be operated to produce a three phase AC power 746 at three output nodes 740, 742, 744.

Each half bridge circuit 728, 748, 750 shown in FIG. 7 includes a pair of switches 710, 712, 714, 716, and 718, 720, respectively. By alternately opening and closing the upper switches 710, 714, 718 and lower switches 712, 716, 720 in each half bridge circuit 728, 748, and 750 an AC square wave power signal can be created at the corresponding output node 740, 742, 744, respectively. Operating the three half bridge circuits 728, 748, 750 with the switch control signals 600 described above results in a three phase AC power signal 746 on the output nodes 740, 742, 744 of the inverter 700.

Figure 8:
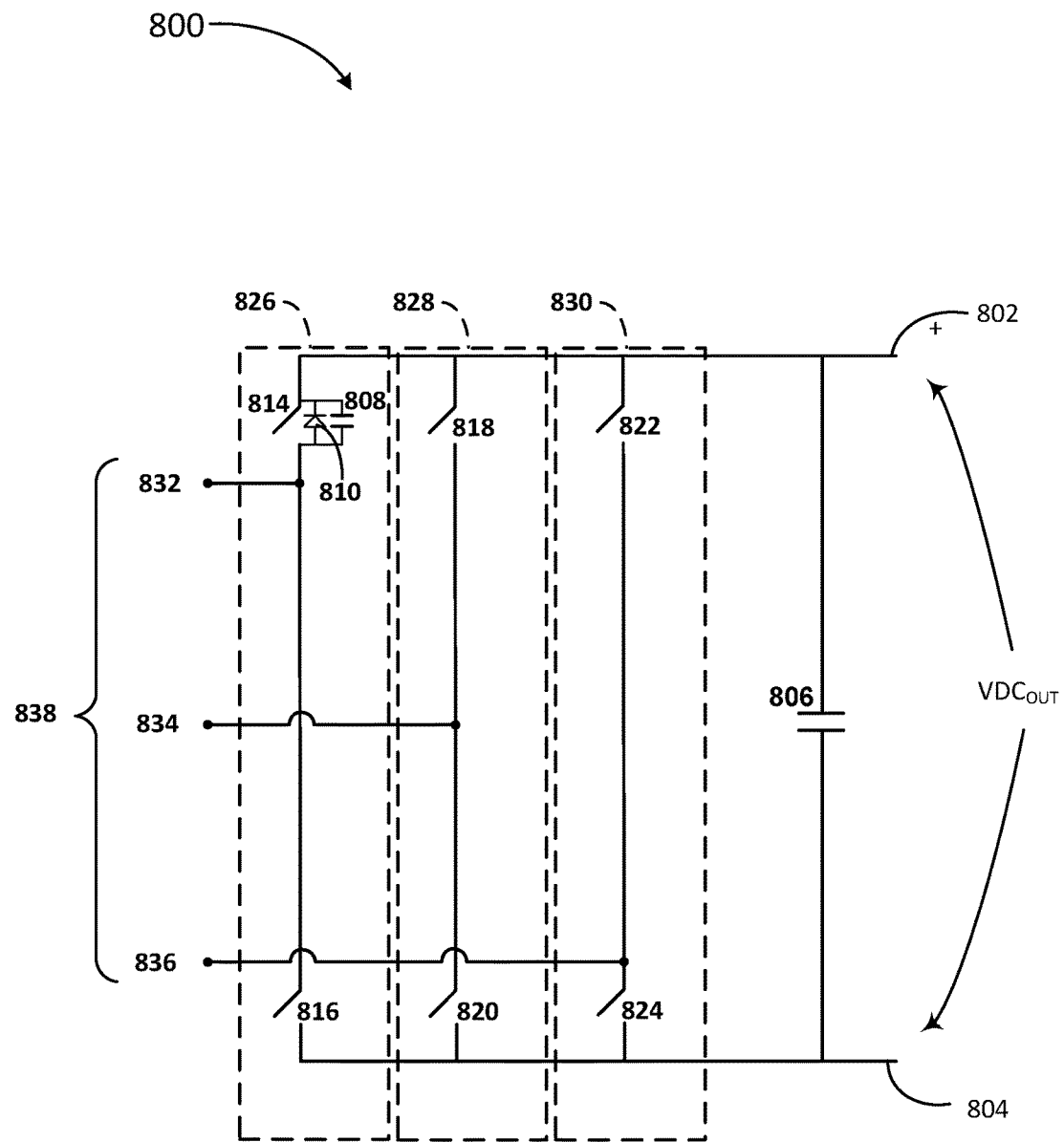
FIG. 8 illustrates an exemplary embodiment of a three phase rectifier circuit for a resonant circuit incorporating aspects of the disclosed embodiments.

FIG. 8 illustrates an exemplary embodiment of a three phase rectifier circuit 800 configured to receive a three phase AC power 838 and produce a DC output power $VDC_{OUT}$. The exemplary rectifier circuit 800 receives a three phase AC power at the three rectifier circuit input nodes 832, 834, 836. Three phase AC input power 838 may be produced for example by a resonant circuit, such as the three phase AC power 210 or 310 produced by the resonant circuit 100, coupled to either the star circuit 200 or delta circuit 300, respectively. The rectifier circuit 800 includes a positive (+) output rail 802 and a negative (−) output rail 804 for the DC output power $VDC_{OUT}$. An output filter capacitor 806 is coupled across the positive (+) and negative (−) output rails 802, 804 and configured to filter noise and reduce ripple from the output power $VDC_{OUT}$. Three half bridge circuits 826, 828, 830 are coupled in parallel across the output rails 802, 804. Each half bridge circuit 826, 828, 830 is configured to receive one phase 832, 834, 836, of a three phase AC power 838 at a center node 832, 834, 838 of each half bridge circuit 826, 828, 830 respectively. Each half bridge circuit 832, 834, 838 uses a pair of switches 814, 816, 818, 820, and 822, 824, respectively to rectify the three phase AC input power 838. The switches 814, 816, 818, 820, 822, 824 may be any appropriate type of switching device configured to conduct, or not conduct, electric current based on switch control signals, such as the switch control signals 600 described above.

As described above when the switching devices 814, 816, 818, 820, 822, 824 are MOSFET type switches, each switch will include a body diode 810 and a parasitic capacitance 808 in parallel with the switch 814. Alternatively, the switches may be implemented as IGBT or other suitable switching devices in which case the parallel diode 810 and capacitor 808 are added as separate electronic components. As before for clarity of illustration only the parallel diode 810 and capacitor 808 associated with switch 814 are shown, however those skilled in the art will recognize that the other switching devices 816, 818, 820, 822, 824 also have a diode and capacitor coupled in parallel with each switch 816, 818, 820, 822, 824. In certain embodiments it may be beneficial to replace the switches 814, 816, 818, 820, 822, 824 along with the parallel diode 810 and capacitance 808 with a simple diode rather than the transistor type switch 814, 816, 818, 820, 822, 824 illustrated in FIG. 8.

Figure 9:
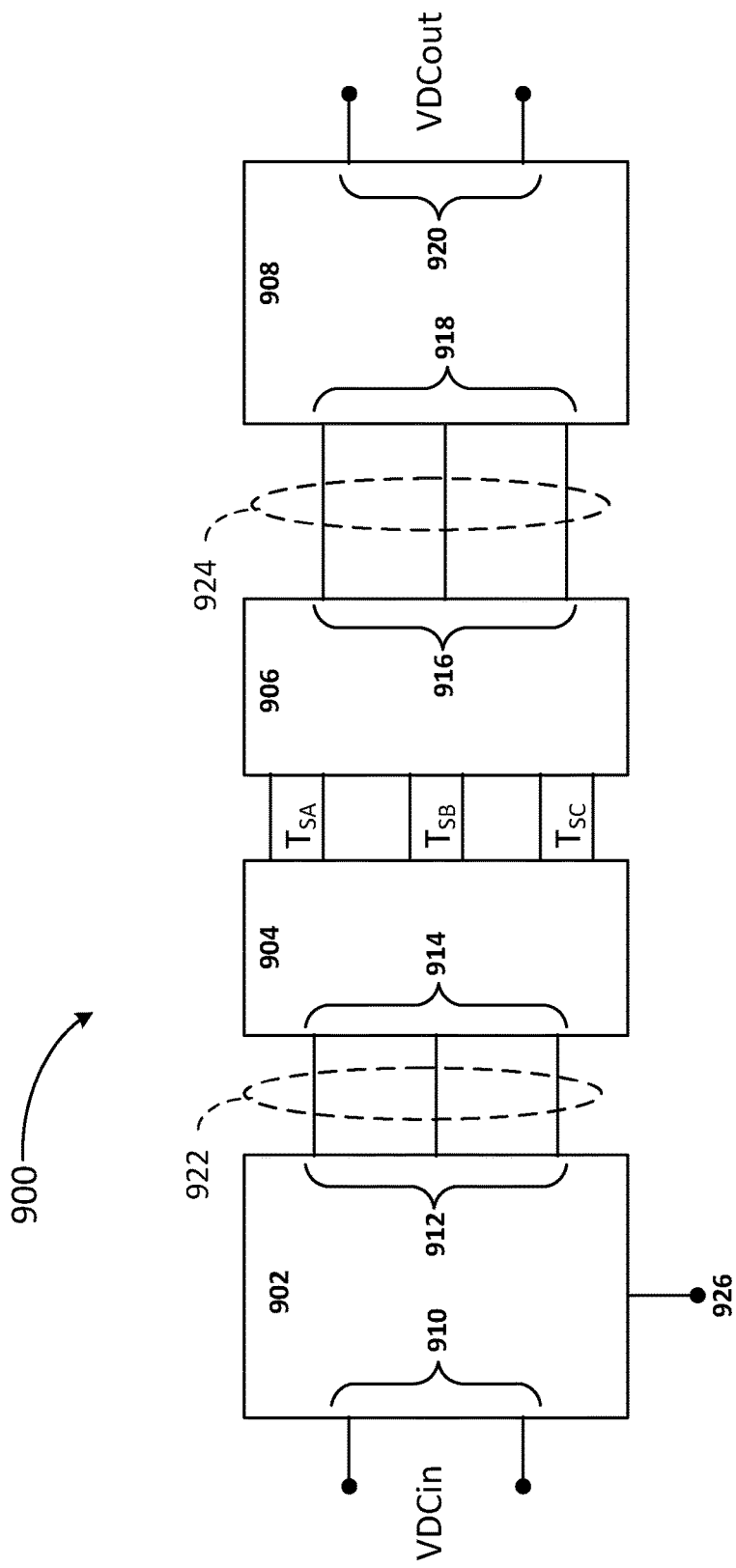
FIG. 9 illustrates a block diagram of an exemplary resonant DC to DC converter with a resonant circuit incorporating aspects of the disclosed embodiments.

FIG. 9 illustrates an exemplary embodiment of a resonant DC to DC converter 900 configured to receive a DC input power VDCin and produce a regulated DC output power VDCout. The resonant DC to DC converter 900 includes an inverter 902, which may include either of the inverter circuits 500 or 700 described above. The inverter 902 is configured to receive a DC input voltage VDCin across a pair of input nodes or connections 910 and produce a three phase AC input power 922 on a set of output nodes or connections 912. A resonant circuit 904 is coupled to the three phase AC input power 922 via a set of resonant circuit input nodes 914. The resonant circuit 100 described above and with reference to FIG. 1 is suitable for use as the resonant circuit 904. In this example, the resonant circuit input nodes 914 correspond to the three resonant circuit input nodes 108, 110, 112. The secondary windings $T_{SA}$, $T_{SB}$, $T_{SC}$ of the resonant circuit 904 are coupled in an output configuration 906 such as the star configuration 200 or delta configuration 300 described above and with respect to FIG. 2 and FIG. 3. The output configuration produces a three phase AC output power 924 on a set of output nodes 916. The three phase AC output power 924 is coupled to the input nodes 918 of a rectifier 908. The rectifier circuit 800 described above and illustrated in FIG. 8 is appropriate for use in the rectifier 908. The rectifier 908 produces a filtered low ripple DC output power VDCout across a pair of output nodes 920.

In certain embodiments it is advantageous to regulate the DC output power VDCout at a desired level. As discussed above, the three phase AC output power 924 produced by the resonant circuit 904 may be adjusted by varying the frequency of the three phase AC input power 922 being supplied to the resonant circuit input nodes 914. To facilitate regulation of the output power VDCout, the inverter 902 may be configured to accept an input signal 926 that can vary the frequency of the three phase AC input power 922 produced by the inverter 902. Thus, by varying the input signal 926 in accordance with fluctuations in the output power VDCout, the output power VDCout may be regulated at a desired set point.

Figure 10:
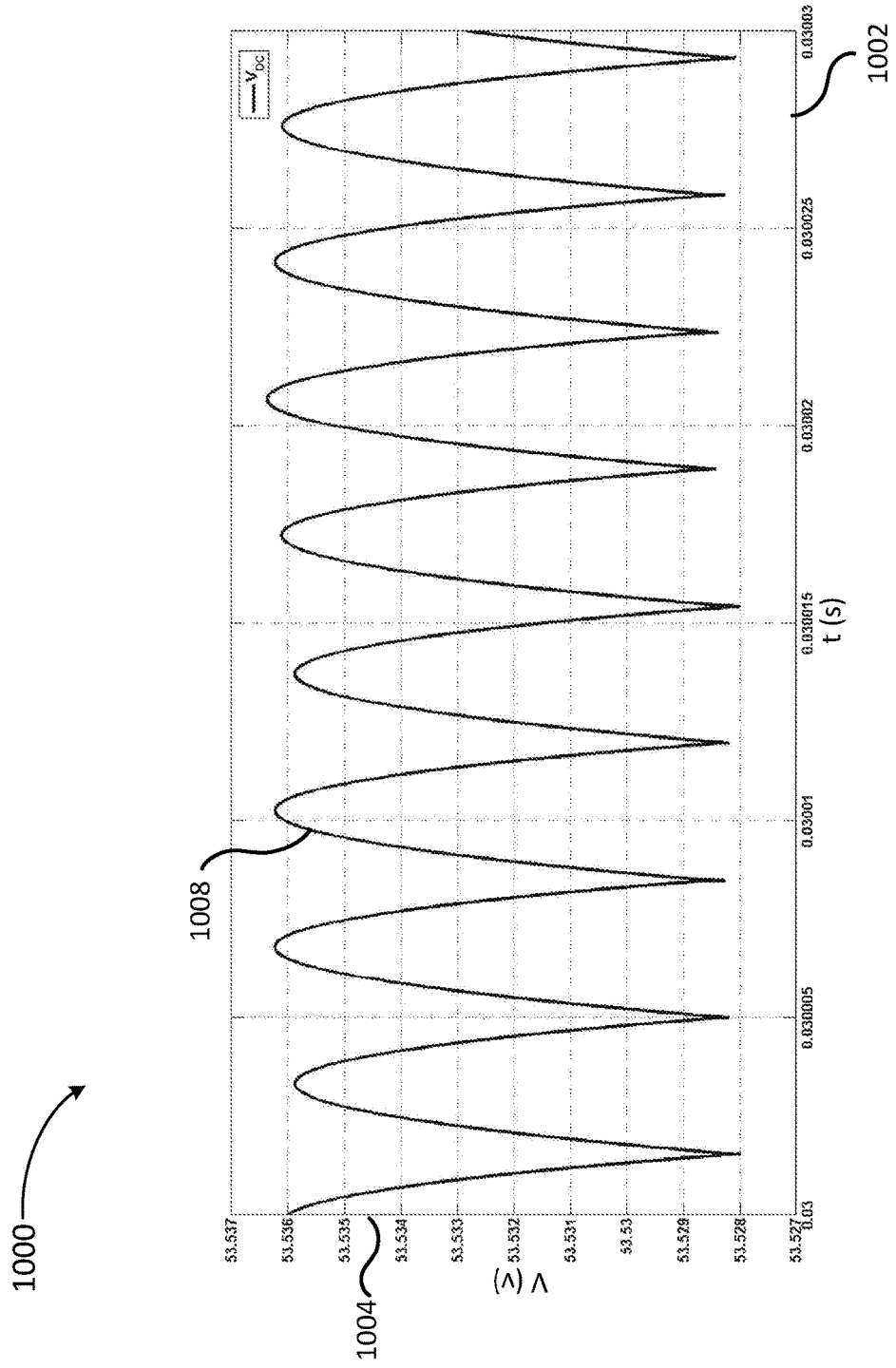
FIG. 10 illustrates a graph showing a DC output voltage of an exemplary DC to DC converter based on a resonant circuit incorporating aspect of the disclosed embodiments.

FIG. 10 illustrates a graph 1000 showing an exemplary DC output voltage 1008 as may be produced by the exemplary resonant DC to DC converter 900. The graph 1000 measures time in seconds increasing to the right along a horizontal axis 1002, and measures voltage in in volts (v) increasing upward along a vertical axis 1004. The DC output power 1008 has a nominal voltage of about 53.5 volts. Alternatively, the DC output power may be configured for any desired nominal voltage. As can be seen in the graph 1000, the DC output power 1008 has relatively small ripple varying from about 53.528 volts and 53.536 volts or about 0.015%.

Thus, while there have been shown, described and pointed out, fundamental novel features of disclosure as applied to the exemplary embodiments thereof, it will be understood that various omissions, substitutions and changes in the form and details of devices and methods illustrated, and in their operation, may be made by those skilled in the art without departing from the spirit and scope of the presently disclosed invention. Further, it is expressly intended that all combinations of those elements, which perform substantially the same function in substantially the same way to achieve the same results, are within the scope of disclosure. Moreover, it should be recognized that structures and/or elements shown and/or described in connection with any disclosed form or embodiment of disclosure may be incorporated in any other disclosed or described or suggested form or embodiment as a general matter of design choice. It is the intention, therefore, to be limited only as indicated by the scope of the claims appended hereto.

What is claimed is:

1. A resonant DC-DC converter circuit comprising:
a first input node, a second input node, and a third input node, each of the first, second and third input nodes configured to receive one phase of a three phase input power;
a delta circuit comprising a first leg connected between a first corner node and a second corner node, a second leg connected between the second corner node and a third corner node, and a third leg connected between the third corner node and the first corner node; and
a first outer resonant device connected between the first input node and the first corner node; a second outer resonant device connected between the second input node and the second corner node; and a third outer resonant device connected between the third input node and the third corner node,
wherein the first leg consists of a first inner resonant device and a first transformer, the first inner resonant device is connected in series between the first corner node and the first transformer, the second leg consists of a second inner resonant device and a second transformer, the second inner resonant device is connected in series between the second corner node and the second transformer, and the third leg consists of a third inner resonant device and a third transformer, the third inner resonant device is connected in series between the third corner node and the third transformer.

2. The resonant DC-DC converter circuit of claim 1 wherein the first outer resonant device, the second outer resonant device, and the third outer resonant device each comprises a capacitor, and the first inner resonant device, the second inner resonant device, and the third inner resonant device each comprises an inductor.

3. The resonant DC-DC converter circuit of claim 1, wherein the first outer resonant device, the second outer resonant device, and the third outer resonant device each comprises an inductor, and the first inner resonant device, the second inner resonant device, and the third inner resonant device each comprises a capacitor.

4. The resonant DC-DC converter circuit of claim 1, wherein the first inner resonant device, the second inner resonant device, and the third inner resonant device are incorporated into a single integrated inductive device.

5. The resonant DC-DC converter circuit of claim 1 wherein the first outer resonant device, the second outer resonant device, and the third outer resonant device are incorporated into a single integrated inductive device.

6. The resonant DC-DC converter circuit of claim 1 wherein the first transformer comprises a first primary winding connected in parallel with a first shunt inductor, the second transformer comprises a second primary winding connected in parallel with a second shunt inductor and the third transformer comprises a third primary winding connected in parallel with a third shunt inductor.

7. The resonant DC-DC converter circuit of claim 6 wherein the first shunt inductor, the second shunt inductor, and the third shunt inductor are incorporated into a single integrated inductive device.

8. The resonant DC-DC converter circuit of claim 6, wherein the first shunt inductor, the second shunt inductor, and the third shunt inductor each comprises a magnetizing inductance of the first primary winding, the second primary winding, and the third primary winding respectively.

9. The resonant DC-DC converter circuit of claim 6 wherein the first transformer comprises a first secondary winding magnetically coupled to the first primary winding, the second transformer comprises a second secondary winding magnetically coupled to the second primary winding, and the third transformer comprises a third secondary winding magnetically coupled to the third primary winding, and wherein the first secondary winding, the second secondary winding, and the third secondary winding are connected together in a delta configuration.

10. The resonant DC-DC converter circuit of claim 6 wherein the first secondary winding, the second secondary winding, and the third secondary winding are connected together in a star configuration.

11. The resonant DC-DC converter circuit of claim 9 comprising a first resonant circuit output node connected to the first secondary winding, a second resonant circuit output node connected to the second secondary winding, and a third resonant circuit output node connected to the third secondary winding; and a rectifier circuit configured to receive a three phase AC power from the first resonant circuit output node, the second resonant circuit output node and the third resonant circuit output node to produce a DC power.

12. The resonant DC-DC converter circuit of claim 1 comprising an inverter circuit configured to receive a DC input voltage, wherein the inverter circuit comprises:
a first half bridge circuit, a second half bridge circuit, and a third half bridge circuit, each connected in parallel across the DC input voltage and configured to provide a square wave voltage to a respective one of the first input node, the second input node and the third input node.

13. The resonant DC-DC converter circuit of claim comprising an inverter circuit configured to receive a DC input voltage, wherein the inverter circuit comprises: wherein a first half bridge circuit, a second half bridge circuit, and a third half bridge circuit are connected in series across the DC input voltage and configured to provide a square wave voltage to a respective one of the first input node, the second input node and the third input node.

14. The resonant DC-DC converter circuit of claim 1 wherein the first transformer, the second transformer, and the third transformer are incorporated into a single integrated transformer device.

* * * * *